May 13, 1958
C. W. SWEET
2,834,227
SLIPPING CLUTCH VARIABLE SPEED GEAR
Filed July 29, 1955
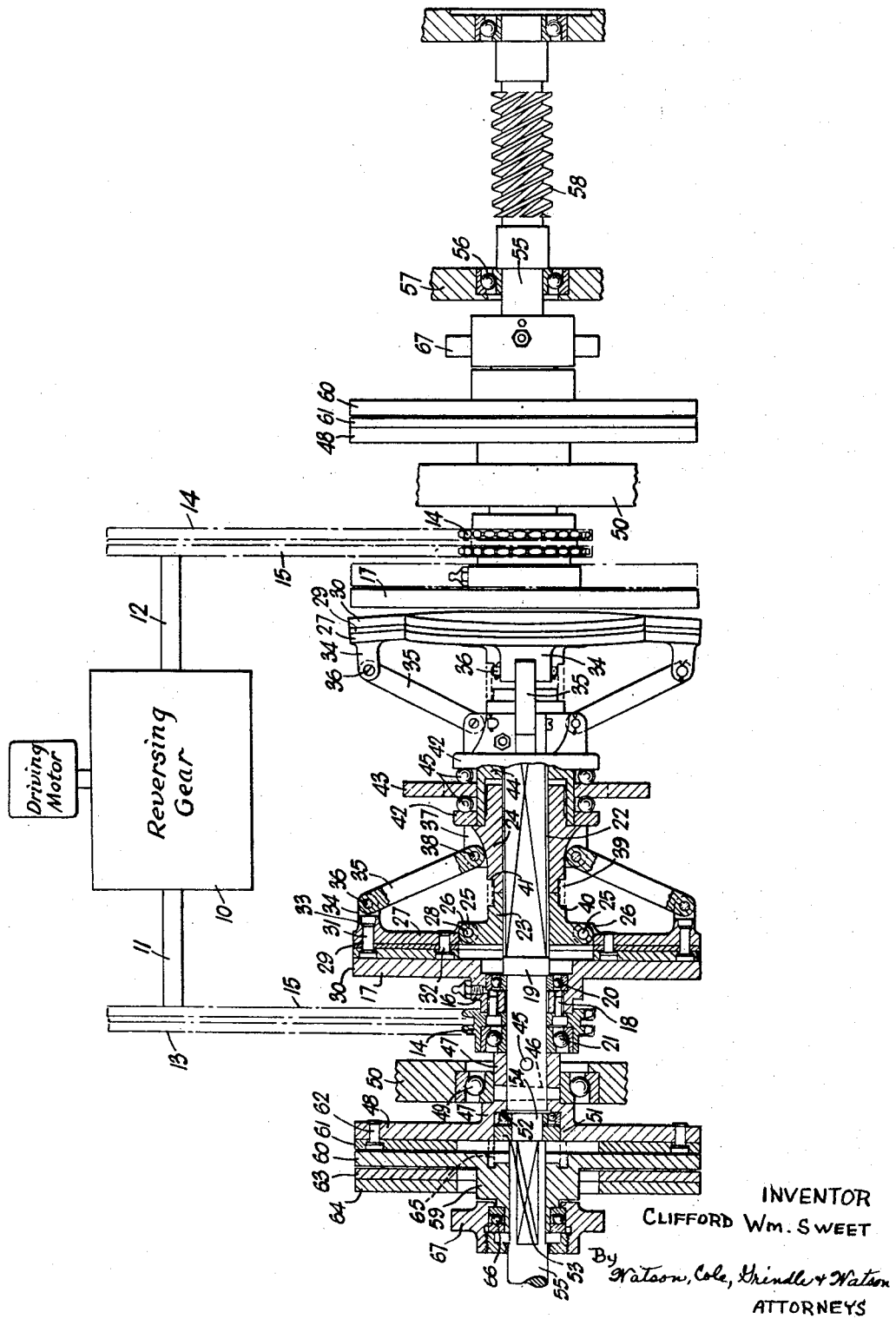
INVENTOR
CLIFFORD Wm. SWEET
By Watson, Cole, Grindle & Watson
ATTORNEYS

United States Patent Office 2,834,227
Patented May 13, 1958

2,834,227

SLIPPING CLUTCH VARIABLE SPEED GEAR

Clifford William Sweet, Orpington, England, assignor to Leverstart Limited, London, England, a British company Application July 29, 1955, Serial No. 525,304

Claims priority, application Great Britain March 31, 1955

12 Claims. (Cl. 74—665)

This invention relates to slipping clutch variable speed gears and has for one of its objects to provide a simple and compact arrangement which may be used for driving the moving parts of a fork truck.

According to this invention a slipping clutch variable speed gear comprises two clutch members secured respectively to two relatively rotatable members having opposed faces transversely arranged with respect to the axis of rotation, one of which clutch members comprises a body part on which are adjustably mounted a number of elements each capable of swinging about an axis transverse to the axis of rotation so as to bring a greater or lesser area of their friction faces into engagement with the face of the other clutch member and means for imparting relative axial movement between the two clutch members.

The friction plate of each element may be sector shaped or part annular shaped and each element may be so adjustably mounted on said body part as to swing about a transverse axis disposed adjacent to the rotation axis.

One end of a link may be pivotally connected to the outer part of each element and the other end of the link may be pivotally connected to a second body part which is axially movable in relation to the first part and spring means may be disposed between the two parts for resisting movement of the parts towards one another and means are provided for imparting said axial movement to the second part whereas the other part is fixed against axial movement.

The two body parts may be keyed or splined to a driven shaft and the other part of the clutch is rotatable in respect to the driven shaft but fixed against axial movement and is provided with means for rotating it.

Said other part of the clutch may comprise a metal plate having a hub portion to which is secured a driving sprocket.

In any of the arrangements referred to above one of the clutch members is provided with a flat metal friction plate and each of the elements on the other clutch part is formed from metal and has nonmetallic friction lining attached thereto. Preferably a layer of heat insulating material is arranged between each non metallic friction lining and the metal element.

The aforesaid driven shaft may have secured thereto one part of an auxiliary clutch the other part of which clutch is secured to a shaft for the mechanism to be driven.

A number of separately driven clutch members may be rotatably mounted on said driven shaft each having associated therewith a set of clutch elements pivotally mounted on the other member of the clutch and means may be provided for selectively engaging and disengaging the sets of clutch elements.

In employing such a clutch mechanism in a fork truck one of the auxiliary clutches may be arranged in a transmission for driving the wheels of the truck and another of the auxiliary clutches may be arranged in a transmission for raising and lowering the lifting platform of the truck.

The following is a description of one embodiment of the invention suitable for application to a fork truck, reference being made to the accompanying drawing which is a part side elevation and part cross section to a part of a driving transmission for driving the truck wheels and for raising and lowering the fork arms.

The arrangement is such that the truck may be driven in either direction and the fork arms moved either up or down by the use of a single driving motor. The driving motor is arranged to drive a reversing gear indicated diagrammatically at 10 and having two output shafts 11 and 12 which are rotated in opposite directions and have fixed thereto respectively sprocket wheels 13 and 14. The two sprocket wheels 13 and 14 are arranged to drive respectively two other sprocket wheels 14 through chains 15. Each sprocket wheel 14 is secured to a hub 16 of a clutch plate 17 by screws 18. Each hub 16 and sprocket wheel 14 is rotatably mounted on a main driven shaft 19 by means of a ball bearing 20 and a thrust race 21. The centre part of the driving shaft 19 is splined at 22 and axially slidable on this splined portion are two internally splined hub portions 23 and 24. The hub portion 23 is provided with four outwardly extending lugs 25 each of which lugs is straddled by a fork 26 formed on a part inner face of plate 27. A boss at the outer end is forked in the fork 26 and lugs 25. Connected to the outer face of each part annulas 27 is an asbestos packing 29 and a suitable friction lining 30 by means of suitable bolts or rivets 31 and 32. The rivets 31 extend through the inner face of plate 27. A boss at the outer end is forked at 34. Each fork straddles one end of a link 35 which is pivotally attached thereto by a pivot pin 36 which passes through a hole in the links and the fork 24. The other end of each link is accommodated between two lugs 37, formed on the other hub portion to which it is attached by a pivot pin 38 extending through the lugs 37.

A compression spring 39 is disposed between shoulders 40 and 41 formed on the two hub portions 23 and 24 respectively. A thrust race 42 is secured to each hub portion 24 and disposed between the two thrust races is a selector ring 43 having an internally splined boss 44 which can slide on the main splined shaft 22. Ball bearings 45 are arranged between the faces of the selector ring 43 and the thrust races 42. A control fork not shown is arranged to engage the selector ring 43 and move it axially on either side of a neutral position. Each end of the main driven shaft 19 extends beyond the thrust race 21 and has secured to it, by taper pins 45, 46, a boss 47 which is formed at the centre of another clutch plate 48. The boss 47 is supported by a thrust race 49 on a fixed part 50 of the apparatus. The boss 47 is also formed with a housing 51 in which is located a ball bearing 52 and an oil sealing ring 53. Ball bearings support the reduced end 54 of a subsidiary driving shaft 55 which in its turn is supported by a thrust race 56 on another part 57 as seen to the right of the figure. The shaft 55 to the left of the figures drives the transmission for the wheels of the truck. The subsidiary shaft 55 on the other side of the apparatus is formed with a worm wheel 58 which drives a transmission (not shown) for elevating and lowering the forks. Each shaft 55 has axially and slidably mounted upon it the hub portion 59 of another clutch plate 60 which is arranged between friction lining 61 secured to the aforesaid clutch plate 48 and a friction lining 63 on a plate 64 secured to a fixed part of the apparatus not shown. The friction linings may be secured by rivets 62. A helical compression spring 65 is disposed between the hub portions 59 and 47. The hub portion 59 is keyed or splined to the shaft 55 and can be moved axially by a selector 67 through a thrust race 66 so that the clutch plate 60 may be brought into engagement with either the friction lining 61 or 63. In the figure the parts are so shown in a position in which the plate 60 is clear of both friction linings 61 and 63. The selector ring 43 has been moved to the left of a neutral position and in so doing has compressed the spring 39 and pressure has been applied to both the inner and outer peripheries of each of annular portions 27 whereby uniform pressure is applied over the whole area of the friction lining 30 and the flat face 17. Thus a drive is transmitted from the gear box 10 through the sprocket wheels 14 and clutch plate 27 to the shaft 19. Thus as soon as the selector 67 is moved into a direction to engage the plate 60 with a friction lining 61 a subsidiary driven shaft 65 will be rotated and transmits drive to the wheels of the fork truck and the truck is driven at full speed. Assuming now that the ring 43 is moved slightly to the right although the spring 35 will maintain engagement of the inner peripheral portion of the friction lining 30 with the face 17 it will force the hub portion 24 to the right drawing the links 35 with it and the plate 27 will be swung about the pivot axis 28 and there will be a reduced area of contact between the friction lining 30 and the plate 17. Thus a certain degree of slip will occur reducing the speed at which the truck wheels are driven. The more the hub portion 24 is moved to the right the greater will be the slip and the greater the reduction in speed until the selector ring 43 reaches a central neutral position when there will be little or no pressure between the inner peripheral portion of each part annular plate 27 and the face 17 and no drive will be transmitted. During the whole of this period the other clutch on the opposite side of the selector ring 43 will have remained in a disengaged positon but if the selector ring 43 is moved to the right of the neutral position it will permit the clutch to be engaged and the truck will be driven in the reverse direction.

The selector 67 to the right of the figure, during this operation, will be moved into a position in which the right hand clutch plate 60 is brought into engagement with the stationary clutch plate 64 and lining 63 whereby the worm shaft is disengaged and is held stationary. If it is desired to drive the worm wheel and the wheels of the truck the selector 67 to the left of the figure is moved so as to bring the clutch plate 60 into engagement with the plate 64 and lining 63, whereas the selector 67 may be moved so as to bring the clutch plate 60 into engagement with the plate 48 and lining 61.

I claim:

1. A variable speed gear comprising coaxially arranged relatively rotatable driving and driven clutch members, a friction plate secured to one of said members and having a friction face transverse to the axis of rotation of said clutch members, a number of friction elements, mounted on the other member each having a friction face arranged opposite the first said friction face, a pivotal connection between each friction element and said other clutch member and arranged with its axis of pivoting transverse to the axis of rotation of the driving and driven clutch members whereby pivotal movements of said elements result in a greater or lesser open contact between them and the first said friction face and control mechanism adapted to impart pivoted movement to said frictional elements.

2. A variable speed gear according to claim 1 wherein each friction element is sector-shaped and the axis of pivoting of each pivotal connection is disposed close to the axis of rotation of the driving and driven members.

3. A variable speed gear according to claim 1 wherein said control mechanism comprises a control member axially movable in relation to said other clutch member, a compression spring between said control member and clutch member, and a link pivotally connected to each friction element and to the control member.

4. A variable speed gear according to claim 1 and comprising a shaft having said other clutch member keyed thereto and wherein said control mechanism comprises a control member keyed to and axially slidable on said shaft towards and away from said other clutch member, a compression spring between said control member and other clutch members and a link pivotally connected to each friction element and control member.

5. A variable speed gear according to claim 1 and comprising a shaft having the first said clutch member rotatable thereon and the other clutch member keyed thereto and wherein said control mechanism comprises a control member keyed to and axially slidable on said shaft towards and away from said other clutch member, a compression spring between said control member and other clutch members and a link pivotally connected to each friction element and control member.

6. A variable speed gear according to claim 1 and comprising a shaft having the first said clutch member rotatable thereon and the other clutch member keyed thereto and wherein said control mechanism comprises a control member keyed to and axially slidable on said shaft towards and away from said other clutch member, a compression spring between said control member and other clutch members and a link pivotally connected to each friction element and control member, and a driving pinion on the first said clutch member.

7. A variable speed gear according to claim 1 and comprising a shaft having said other clutch member keyed thereto and wherein said control mechanism comprises a control member keyed to and axially slidable on said shaft towards and away from said other clutch member, a compression spring between said control member and other clutch members and a link pivotally connected to each friction element and control member, an auxiliary shaft coaxial with the first said shaft and a clutch between these shafts.

8. A variable speed and reversing gear comprising a gear box having two output shafts rotatable in opposite directions, a primary driven shaft, two pairs of clutch members mounted on said shaft, one clutch member of each pair rotatable on said shaft and the other member of each pair being fixed to said shaft, a transmission between each said rotatable clutch member and one of said output shafts, a friction plate secured to one of said clutch members of each pair and having a friction face transverse to the axis of rotation of the clutch members, a number of friction elements mounted on the other clutch member of each pair having a friction face arranged opposite the first said friction face, a pivotal connection between each friction element and said other clutch member, and arranged with its axis of pivoting transverse to the axis of rotation and a control mechanism adapted to impart pivotal movement to the two sets of frictonal elements in opposite directions.

9. A variable speed and reversing gear according to claim 8 wherein said control mechanism comprises a control member associated with each clutch member in which said friction elements are pivotally mounted each of which control members is axially movable in relation to its clutch member and is fixed against rotation on said primary driven shaft, a compression spring between each control member and its clutch member and links pivotally connected to each control member and to the friction elements on its clutch member.

10. A variable speed and reversing gear according to claim 9 wherein an actuating member is arranged to impart simultaneous movement to the two control members.

11. A variable speed and reversing gear according to claim 8 wherein two auxiliary driven shafts arranged respectively at opposite ends of the primary driven shaft and a clutch is provided between each auxiliary driven shaft and the primary shaft.

12. A variable speed and reversing gear for a fork lift truck according to claim 8 wherein two auxiliary driven shafts are arranged respectively at opposite ends of the primary driven shaft and a clutch is provided between each auxiliary driven shaft and the primary shaft, one of which auxiliary shafts is arranged for driving the wheels of the truck and the other for driving the lifting mechanism for the fork arms.

References Cited in the file of this patent

FOREIGN PATENTS 556,951    Great Britain _____ Jan. 22, 1945